US012807072B2

(12) United States Patent
Brown et al.

(10) Patent No.: US 12,807,072 B2
(45) Date of Patent: Nov. 24, 2026

(54) SYSTEMS AND METHODS FOR ATTACHING A SNOWPLOW TO A VEHICLE

(71) Applicant: Ford Global Technologies, LLC, Dearborn, MI (US)

(72) Inventors: Andrew Brown, Royal Oak, MI (US); Anthony Maraldo, Southgate, MI (US); Brendan Diamond, Naples, FL (US); Keith Weston, Canton, MI (US); Michael Alan Mcnees, Flat Rock, MI (US); Jim Stevens, Belleville, MI (US)

( * ) Notice: Subject to any disclaimer, the term of this patent is extended or adjusted under 35 U.S.C. 154(b) by 93 days.

(21) Appl. No.: 18/946,586

(22) Filed: Nov. 13, 2024

(65) Prior Publication Data

US 2026/0131730 A1 May 14, 2026

(51) Int. Cl.
*B60R 1/24* (2022.01)
*E01H 5/06* (2006.01)

(52) U.S. Cl.
CPC .......... *B60R 1/24* (2022.01); *B60R 2300/305* (2013.01); *B60R 2300/80* (2013.01); *E01H 5/066* (2013.01)

(58) Field of Classification Search
CPC . B60R 1/24; B60R 2300/305; B60R 2300/80; E01H 5/066
See application file for complete search history.

(56) References Cited

U.S. PATENT DOCUMENTS 6,202,328 B1 * 3/2001 Fulton ..................... E01H 5/068 37/231
2002/0092211 A1 * 7/2002 Bateman, Jr. ........... E02F 3/815 37/466
2005/0193603 A1 * 9/2005 Schultz ................. E02F 3/7627 37/417
2007/0234597 A1 * 10/2007 Schpok ................... E01H 5/066 37/231
2008/0073090 A1 3/2008 Harris
2015/0105974 A1 4/2015 Kleve et al.
2019/0094872 A1 * 3/2019 Li ............................ B60D 1/36
2021/0017007 A1 1/2021 Houston et al.
(Continued)

OTHER PUBLICATIONS

Ford, How Ford Uses Artificial Intelligence to Make Hitching a Trailer Easier Than Ever, https://media.ford.com/content/fordmedia/fna/us/en/news/2023/04/05/how-ford-uses-artificial-intelligence-to-make-hitching-a-trailer.html, Apr. 5, 2003, pp. 1-4.

*Primary Examiner* — Mary Cheung
(74) *Attorney, Agent, or Firm* — Frank Lollo; Eversheds Sutherland (US) LLP

(57) ABSTRACT

Systems and methods for attaching a snowplow to a vehicle are provided. Due to the size of the snowplow and the mounting bracket being located in front of the vehicle and closer to the ground, it is difficult for a user of the vehicle to correctly orient the vehicle with respect to the snowplow. The techniques described in this disclosure use virtual alignment features that are either programmed into the vehicle or learned by the vehicle to correctly align the vehicle to the snowplow. The virtual alignment features correspond to the attachment points of the snowplow mounting bracket of the vehicle. In some instances, the vehicle may autonomously detect a snowplow and orient itself to align with the snowplow using the virtual alignment markers and other alignment features of the snowplow. This makes the snowplow attachment process seamless and easy.

20 Claims, 9 Drawing Sheets

(56) References Cited

U.S. PATENT DOCUMENTS

| | | | | |
|---|---|---|---|---|
| 2022/0134951 | A1 | 5/2022 | Zhang | |
| 2022/0235528 | A1* | 7/2022 | Sand | E01H 5/066 |
| 2024/0093447 | A1* | 3/2024 | Schlegelmilch | E01H 5/061 |
| 2025/0187543 | A1* | 6/2025 | Fowler | G06T 7/80 |

* cited by examiner

SYSTEMS AND METHODS FOR ATTACHING A SNOWPLOW TO A VEHICLE

FIELD

The present disclosure relates to attaching a snowplow to a vehicle. Specifically, embodiments of the present disclosure relate to systems and methods for seamless attachment of a snowplow to a front end of the vehicle.

BACKGROUND

Attaching a snowplow to a front of a vehicle can often be a challenge. The installation process may require specialized tools and knowledge, making it a complex task for those without experience. One issue is ensuring that the mounting brackets and hardware are correctly positioned. Misalignment can lead to uneven wear on the plow and the vehicle. This process often requires precise measurements and adjustments, which can be difficult without the right tools and expertise. Even a small misalignment can cause the plow to sit at an incorrect angle, making it less effective at clearing snow.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
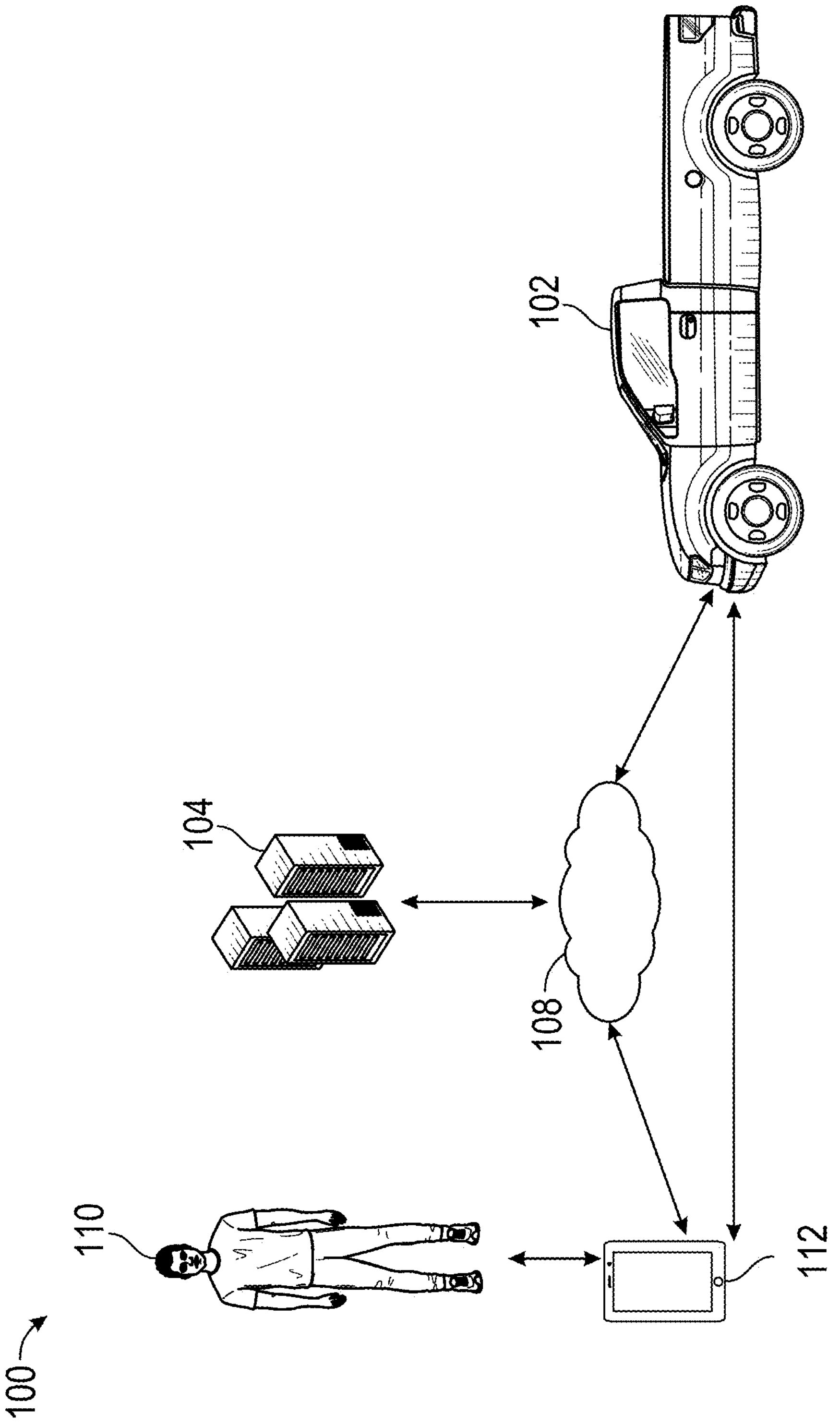
FIG. 1 illustrates an environment in which embodiments of the present disclosure can be implemented.

The present disclosure describes systems and methods for attaching a snowplow to a front side of a vehicle.

Embodiments of the present disclosure provide a method of attaching a snowplow to a front of a vehicle. The method includes the vehicle receiving information related to attaching a snowplow to a front end of the vehicle. The vehicle then displays an image of an environment in the front of the vehicle on a screen of the vehicle. The displayed image includes a depiction of the snowplow. The vehicle then displays a plurality of virtual alignment markers, the plurality of alignment markers are associated with a snowplow mounting bracket of the vehicle. The vehicle then aligns each of the plurality of virtual alignment markers with a corresponding alignment feature of the snowplow.

In another instance, a vehicle is provided that includes one or more sensors, one or more processors coupled to the one or more sensors, and one or more memory devices coupled to the one or more processors. The one or more memory devices include instructions which when executed by the one or more processors cause the vehicle to determine, based on user input, that a snowplow is to be attached to a front side of the vehicle, display a plurality of virtual alignment markers associated with a snowplow mounting bracket of the vehicle on a screen of the vehicle, display an image of an external environment in front of the vehicle on the screen that depicts a snowplow, and orients itself with respect to the snowplow such that each of the plurality of virtual alignment markers is aligned with a corresponding alignment feature located on the snowplow.

In yet another instance, a method for attaching a snowplow to a vehicle is provided. The method includes the vehicle receiving an input indicating that a snowplow is to be attached to the vehicle. The vehicle then determines using one or more of its sensors that a snowplow mounting bracket of the vehicle is ready for accepting a snowplow. The vehicle further detects the presence of a snowplow in front of the vehicle and determines using the one or more sensors, a plurality of attachment points of the snowplow. The vehicle further displays a plurality of virtual alignment features on a display of the vehicle. Thereafter, the vehicle moves autonomously to within a first distance from the snowplow and aligns each of a plurality of attachment points of the snowplow mounting bracket to a corresponding attachment point of the snowplow. The vehicle then determines a height of the plurality of attachment points of the snowplow using the one or more sensors and places the plurality of attachment points of the snowplow mounting bracket in a same plane as the plurality of attachment points of the snowplow.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 illustrates an environment 100 in which the embodiments of the present disclosure may be implemented. The vehicle 102 can be any passenger or commercial vehicle such as a car, truck, tanker, bus, or the like. The environment 100 may also include a control server 104. The control server 104 may be part of a cloud-based computing infrastructure and may be associated with and/or include a Telematics Service Delivery Network (SDN) that provides digital data services to the vehicle 102. Details of the control server 104 are provided below with reference to FIG. 10.

The environment 100 may also include a user device 112. The user device 112 may be one of a mobile phone, a tablet, a personal computer, a smart key fob, or the like. The user device 112 may be associated with a user 110 of the vehicle 102. The user 110 may be a driver of the vehicle 102 or a passenger in the vehicle 102. The user device 112 may receive information from the vehicle 102 and/or the control server 104. The user device 112 may have a specialized application installed on it that can interface with the vehicle 102 to download and display various types of vehicle-generated information and other control data. In one embodiment, the vehicle 102 may directly communicate with the user device 112 to send and receive data without the need for the network 108 and/or the server 104.

The environment 100 may further include a network 108. The network 108 illustrates an example communication infrastructure in which the connected devices discussed in various embodiments of this disclosure may communicate. The network 108 may be and/or include the Internet, a private network, public network or other configuration that operates using any one or more known communication protocols such as, for example, transmission control protocol/Internet protocol (TCP/IP), Bluetooth®, Bluetooth® low Energy (BLE), Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer, a Vehicle Control Unit (VCU), and a detection unit. Details of the vehicle 102 are provided below in reference to FIG. 2.

Figure 2:
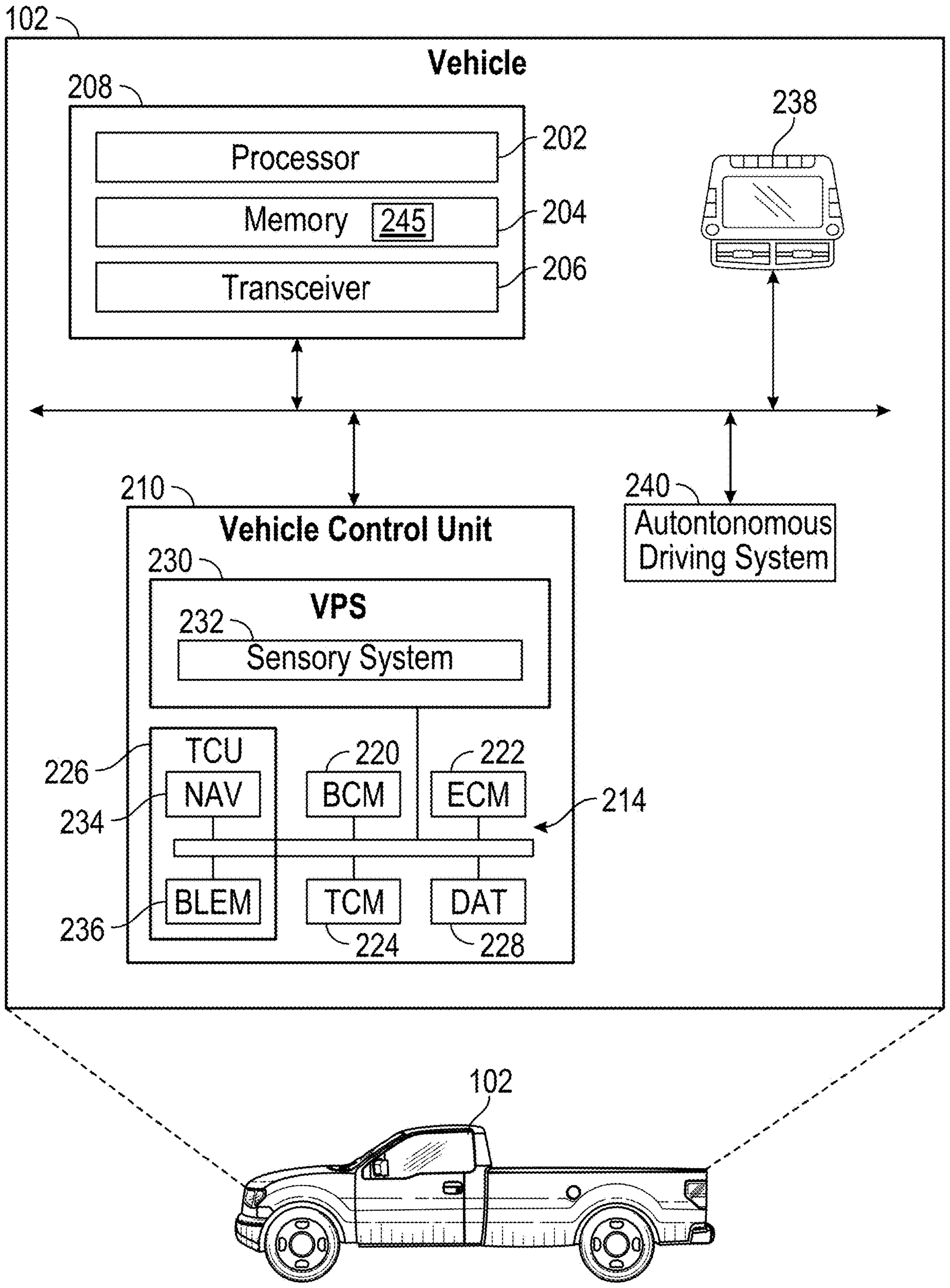
FIG. 2 illustrates a block diagram of a vehicle according to an embodiment of the present disclosure.

FIG. 2 illustrates a block diagram of the vehicle 102 in which embodiments of the present disclosure can be implemented. The vehicle 102 may include a plurality of units including, but not limited to, an automotive computer 208, a Vehicle Control Unit (VCU) 210, and an infotainment unit 238. The VCU 210 may include a plurality of Electronic Control Units (ECUs) 214 disposed in communication with the automotive computer 208.

In some embodiments, a user device, such as a mobile phone, a laptop computer, a smart fob, or the like may be configured to connect with the automotive computer 208, which may communicate via one or more wireless connection(s), and/or may connect with the vehicle 102 directly by using near field communication (NFC) protocols, Bluetooth® protocols, Wi-Fi, Ultra-Wideband (UWB), and other possible data connection and sharing techniques.

The automotive computer 208 may be installed anywhere in the vehicle 102, in accordance with the disclosure. The automotive computer 208 may be or include an electronic vehicle controller, having one or more processor(s) 202, one or more memory devices 204, and one or more transceivers 206.

The processor(s) 202 may be disposed in communication with one or more memory devices disposed in communication with the respective computing systems (e.g., the memory 204 and/or one or more external databases not shown in FIG. 2). The processor(s) 202 may utilize the memory 204 to store programs in code and/or to store data for performing operations in accordance with the disclosure. The memory 204 may be a non-transitory computer-readable storage medium or memory storing a vehicle control program code. The memory 204 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.). In some embodiments, memory 204 may include a module 245 that can implement the various embodiments of the present disclosure. Module 245 may include instructions that can be executed by the processor 202 to realize the various embodiments of the present disclosure.

Automotive computer 208 may also include a transceiver 206. The transceiver 206 may be configured to receive information/inputs from one or more external devices or systems, e.g., a user device 208, an external server, and/or the like. Further, the transceiver 206 may transmit notifications, requests, signals, etc. to the external devices or systems. In addition, the transceiver 206 may be configured to receive information/inputs from vehicle components such as the vehicle sensory system 232, one or more ECUs 214, and/or the like. Further, the transceiver 206 may transmit signals (e.g., command signals) or notifications to the vehicle components such as the BCM 220, the infotainment system 238, and/or the like.

In some embodiments, the VCU 210 may share a power and/or communications bus with the automotive computer 208 and may be configured and/or programmed to coordinate the data between vehicle systems, connected servers and/or the like. The VCU 210 may include or communicate with any combination of the ECUs 214, such as, for example, the BCM 220, an Engine Control Module (ECM) 222, a Transmission Control Module (TCM) 224, a Telematics Control Unit (TCU) 226, a Driver Assistance Technologies (DAT) controller 228, etc. The VCU 210 may further include and/or communicate with a Vehicle Perception System (VPS) 230, having connectivity with and/or control of one or more vehicle sensory system(s) 232. The vehicle sensory system 232 may include one or more vehicle sensors including, but not limited to, a Radio Detection and Ranging (RADAR or "radar") sensor configured for detection and localization of objects inside and outside the vehicle 102 using radio waves, sitting area buckle sensors, sitting area sensors, a Light Detecting and Ranging ("LIDAR") sensor, door sensors, proximity sensors, temperature sensors, wheel sensors, one or more ambient weather or temperature sensors, vehicle interior and exterior cameras, steering wheel sensors, etc. The sensors that are part of the vehicle sensory system 232 may be coupled to the vehicle 102 at one or more locations and in one or more manner. For example, the various sensors of the vehicle sensory system 232 may be integrated into the various subsystems of the vehicle 102, such as doors, mirrors, roof, etc. or attached to the vehicle 102 using an appropriate mounting mechanism. In some embodiments, the various sensors of the vehicle sensory system 232 may be located at the front, back, sides, top, bottom, and underneath the vehicle 102. The location of a sensor may depend on its function. For example, a sensor that monitors the area underneath the vehicle may be connected to a bottom surface of the vehicle 102 while a sensor that can monitor an area to any side of the vehicle 102 may be mounted or integrated into the doors of the vehicle 102. Vehicle sensory system 232 may also include one or more road noise sensors such as accelerometers that are coupled to various mechanical components and/or systems of the vehicle 102. One skilled in the art will realize that the sensors may be coupled to the vehicles in various different ways and locations other than the ones mentioned above.

In some embodiments, the VCU 210 may control vehicle operational aspects and implement one or more instruction sets received from the server 104, the user device 112, or from one or more instruction sets stored in the memory 204.

The TCU 226 may be configured and/or programmed to provide vehicle connectivity to wireless computing systems onboard and off board the vehicle 102, and may include a Navigation (NAV) receiver 234 for receiving and processing a GPS signal, a BLE® Module (BLEM) 236, a Wi-Fi transceiver, a UWB transceiver, and/or other wireless transceivers (not shown in FIG. 2) that may be configurable for wireless communication (including cellular communication) between the vehicle 102 and other systems (e.g., a vehicle key fob (not shown in FIG. 2), an external server, a user device, etc.), computers, and modules. The TCU 226 may be in communication with the ECUs 214 by way of a wired or wireless bus. In some aspects, the TCU 226 may be configured to determine a real-time vehicle geolocation, e.g., via the NAV receiver 234.

The ECUs 214 may control aspects of vehicle operation and communication using inputs from human drivers, inputs from the automotive computer 208, and/or via wireless signal inputs received via the wireless connection(s) from other connected devices, such as the server 206, among others.

The BCM 220 generally includes integration of sensors, vehicle performance indicators, and variable reactors associated with vehicle systems, and may include processor-based power distribution circuitry that may control functions associated with the vehicle body such as lights, windows, security, camera(s), audio system(s), speakers, wipers, door locks and access control, various comfort controls, etc. The BCM 220 may also operate as a gateway for bus and network interfaces to interact with remote ECUs (not shown in FIG. 2).

The DAT controller 228 and/or the autonomous driving system 240 may provide Level-1 through Level-5 automated driving and driver assistance functionality that may include, for example, active parking assistance, vehicle backup assistance, and/or adaptive cruise control, among other features. The DAT controller 228 may also provide aspects of user and environmental inputs usable for user authentication.

In some embodiments, the automotive computer 208 may connect with an infotainment system 238 (or a vehicle Human-Machine Interface (HMI)). The infotainment system 238 may include a touchscreen interface portion, and may include voice recognition features, biometric identification capabilities that may identify users based on facial recognition, voice recognition, fingerprint identification, or other biological identification means. In other aspects, the infotainment system 238 may be further configured to receive user instructions via the touchscreen interface portion, and/or output or display notifications, navigation maps, etc. on the touchscreen interface portion. In some embodiments, the user device 112 may provide the HMI interface.

The computing system architecture of the automotive computer 208 and/or the VCU 210 may omit certain computing modules. It should be readily understood that the computing environment depicted in FIG. 2 is an example of a possible implementation according to the present disclosure, and thus, it should not be considered as limiting or exclusive.

In addition to the components noted above, the vehicle 102 may have numerous mechanical systems and subsystems. A chassis or frame may form the backbone of the vehicle 102 and support the body and other components of the vehicle 102. The vehicle 102 may include an engine that converts fuel into mechanical power, propelling the vehicle forward. The engine includes various components such as the engine block, pistons, valves, and spark plugs. The vehicle 102 may also include a transmission system. The transmission system transfers the engine's power to the wheels. It includes the clutch, gearbox, driveshaft, and differentials, among other components. The transmission adjusts the power output to suit the vehicle's speed and load. The vehicle 102 may also include a suspension system. The suspension system absorbs shocks and maintains contact between the tires and the road, providing a smooth ride. It includes components such as springs, shock absorbers, and linkages. The vehicle 102 also includes a vehicle stopping system that allows the driver to slow down or stop the vehicle 102. It includes components like pedals, master cylinder, lines, and pads or shoes. The vehicle 102 also includes a steering system that enables the driver to guide the car. The steering system includes components such as the steering wheel, steering column, rack and pinion, and tie rods. The vehicle 102 may also include an exhaust system that removes and filters the waste gases produced by the engine. It includes the exhaust manifold, catalytic converter, muffler, and tailpipe, among other components. The vehicle 102 also includes a cooling system that prevents the engine and/or battery from overheating. It includes components such as the radiator, water pump, thermostat, and coolant. The vehicle 102 also includes a cooling system that stores and supplies fuel to the engine. It includes the fuel tank, fuel pump, fuel filter, and fuel injectors. An electrical system of the vehicle 102 powers the car's electrical components. It may include the battery, alternator, starter motor, and wiring. The Heating, Ventilation, and Air Conditioning (HVAC) system controls the temperature inside the vehicle 102. It includes the heater core, blower motor, and air conditioning compressor. In some embodiments, the vehicle may be an electric vehicle (EV) or hybrid vehicle, and in either case some of the aforementioned components would be replaced by an electric motor and a high-voltage battery. All of the mechanical components working together ensure that the vehicle operates optimally.

As mentioned above, attaching a snowplow to the front of a vehicle can be challenging. The vehicle snowplow mounting bracket (also sometimes called the "push beam") is usually located at a lower end of the front of the vehicle near to the ground surface. This makes it difficult for the driver of the vehicle to visually see the snowplow mounting bracket and/or the connection points of the snowplow mounting bracket. This in turn makes it difficult to properly align the vehicle snowplow mounting bracket with the corresponding attachment points of the snowplow. The driver may have to maneuver the vehicle several times in order to properly align the vehicle mounting bracket to the corresponding attachment points of the snowplow. This process may often involve another user guiding the driver from outside of the vehicle in order to complete the alignment. Embodiments of the present disclosure provide methods and systems for aligning the vehicle snowplow mounting bracket with the corresponding attachment points of the snowplow such that even a single person can easily attach a snowplow to the front of a vehicle.

Figure 3:
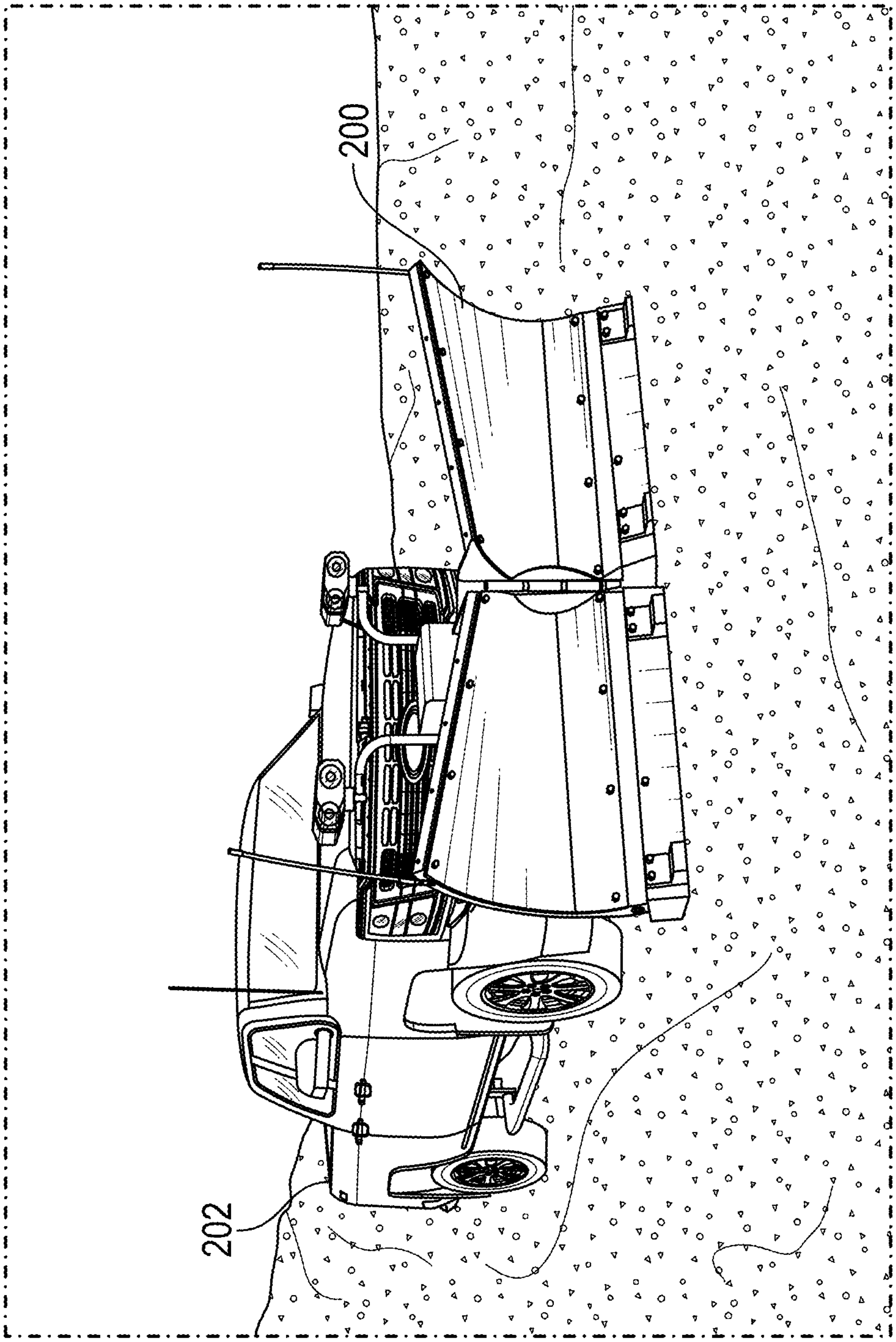
FIG. 3 illustrates a vehicle with a snowplow attached to its front side according to an embodiment of the present disclosure.
Figure 4:
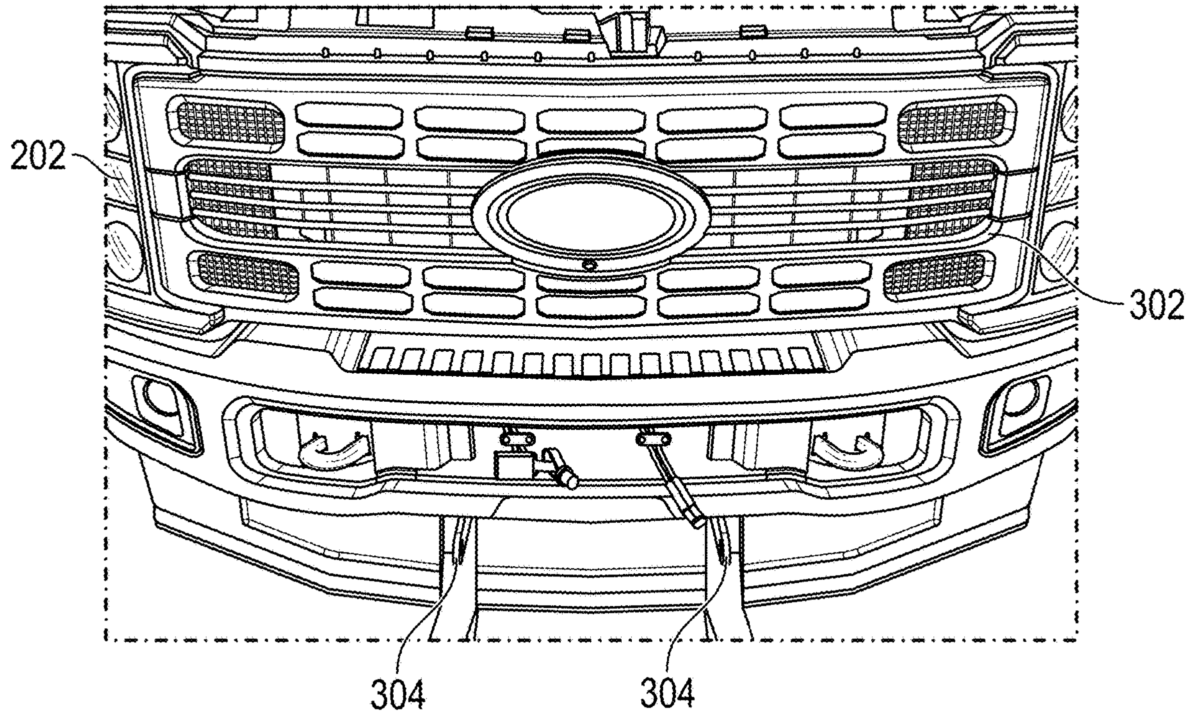
FIG. 4 illustrates a front end of the vehicle according to an embodiment of the present disclosure.

FIG. 3 illustrates a vehicle 202 with a snowplow 200 attached to its front side according to an embodiment of the present disclosure. The vehicle 202 may be similar to the vehicle 102 described above. The snowplow 200 is attached to the front end of the vehicle 202. Operation, as the vehicle 202 is driven along a road, the snowplow 200 clears or scoops up the snow and deposits it at the sides of the vehicle 202 thus clearing the road. FIG. 4 illustrates a front end of the vehicle 202 according to an embodiment of the present disclosure. The front end of the vehicle 202 may include an image sensor, such as a camera, 302 located on a surface of the front end. The image sensor 302 is outward facing and can capture image and video data of an environment in the front of the vehicle 202. The image sensor 302 may have a vertical field of view and a horizontal field of view. In an embodiment, the image sensor 302 may have a vertical field of view of between 100 and 130 degrees and a horizontal field of view between 130 and 180 degrees. The vehicle 202 may also have a snowplow mounting bracket (not shown) installed at a lower side of the front end closer to the ground. The snowplow mounting bracket may have at least two connection points 304 that protrude parallel to the ground from the snowplow mounting bracket of the vehicle 202. Various types of snowplow mounting brackets are available on the market. Each of these snowplow mounting brackets has a different design and consequently the location of the connection points 304 for each of these snowplow mounting brackets may be different.

The image sensor 302 can capture image data of an environment in the front of the vehicle. However, due to the limited vertical and horizontal FOV and the location of the mounting bracket, the image sensor 302 cannot see the mounting bracket and/or the connection points 304. Thus, the driver of the vehicle has no reliable way of knowing where the connection points 304 are located once the driver gets behind the wheel of the vehicle 202. When a snowplow is placed in front of the vehicle 202 for attachment, the driver of the vehicle 202 cannot know the location of the connection points 304 from his/her perspective and hence aligning the vehicle properly to the snowplow becomes difficult. Additionally, as the vehicle 202 is moved closer to the snowplow for attachment, the view of the image sensor 302 is further blocked/restricted by the snowplow and at some point, the driver of the vehicle 202 cannot even see the corresponding connection points on the snowplow.

Figure 5:
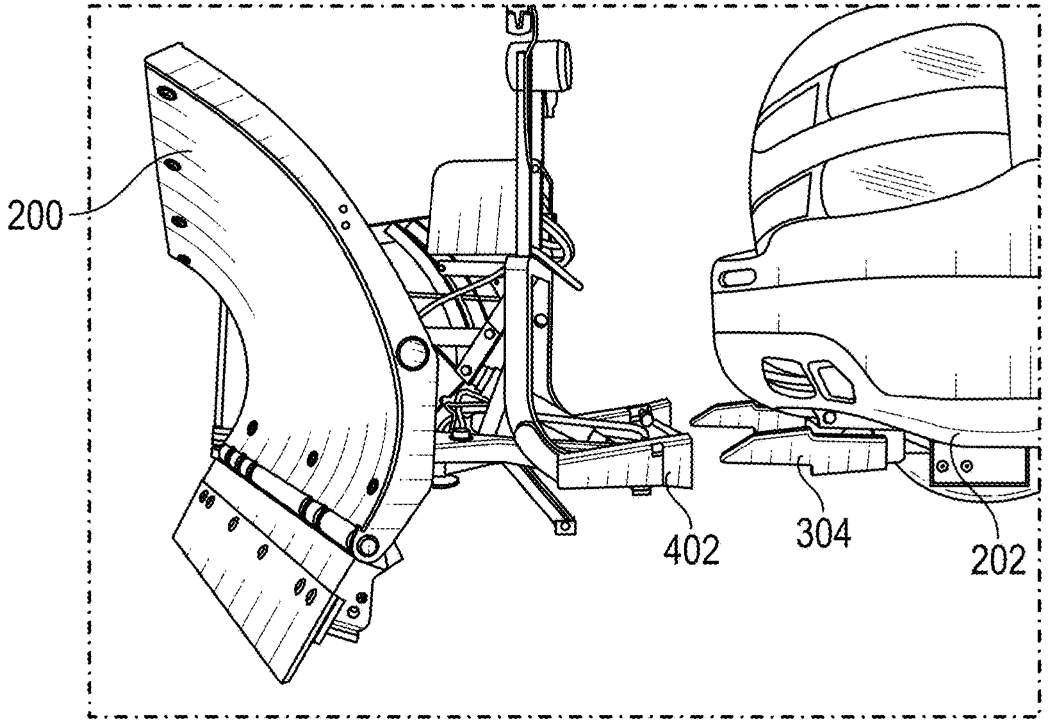
FIG. 5 illustrates a side view of the vehicle and the snowplow according to an embodiment of the present disclosure.

FIG. 5 illustrates a side view of the vehicle 202 and the snowplow 200 according to an embodiment of the present disclosure. The snowplow 200 has attachment points 402 that are configured to mate with the vehicle mounting bracket attachment points 304. However, in order to ensure proper attachment of the snowplow 200 to the vehicle 202 front end, it is important that the vehicle mounting bracket attachment points 304 are properly aligned both vertically and laterally with the snowplow attachment points 402. Further, there may be two or more attachment points between the snowplow 200 and the vehicle 202 and hence all of the attachment points have to be precisely aligned in order to couple the snowplow 200 to the vehicle 202. This makes the attachment process more difficult.

Figure 6:
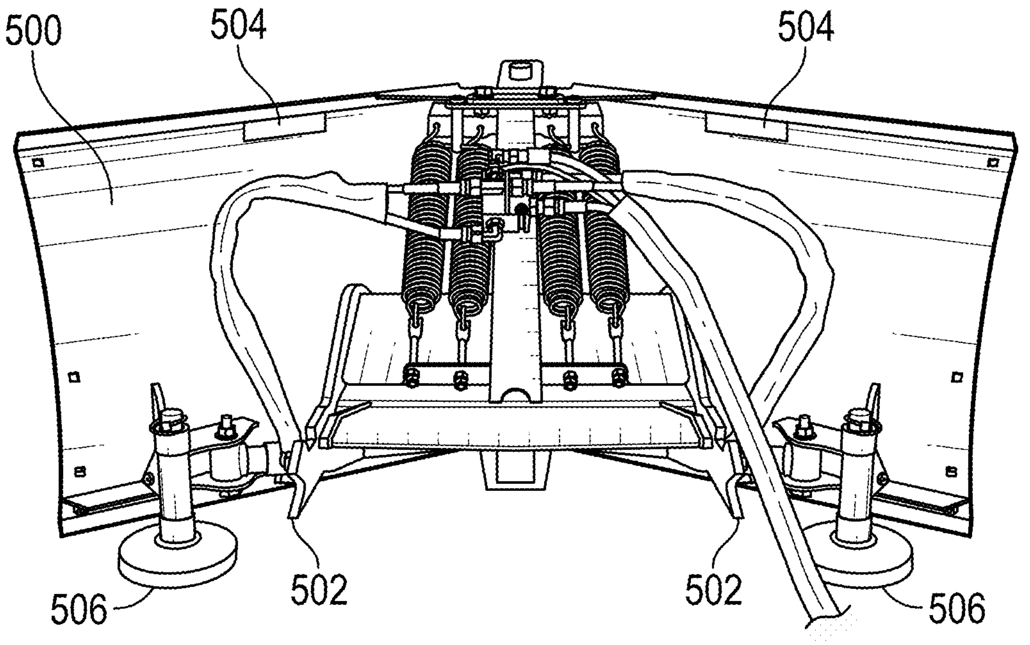
FIG. 6 illustrates a snowplow with special alignment features according to another embodiment of the present disclosure.

FIG. 6 illustrates a snowplow 500 with special alignment features according to an embodiment of the present disclosure. The snowplow 500 includes a plurality of connection points 502 on a backside of the snowplow 500. The connection points 502 are configured to mate with corresponding connection points on the vehicle snowplow mounting bracket described above. The snowplow 500 also includes a pair of legs 506 that support the snowplow 500. The legs 506 are configured to be placed on the ground when the snowplow 500 is being attached to the vehicle. The snowplow 500 also includes a plurality of alignment features 504. Each alignment feature 504 corresponds to a connection feature 502. Thus, there are the same number of alignment features 504 as there are connection feature 502 on the snowplow 500. In an embodiment, the alignment features 504 are coupled to the snowplow at an upper side of the snowplow 500. The alignment features 504 are placed such that they are visible to a driver of the vehicle when the snowplow 500 is placed in front of the vehicle and the driver is seated behind the wheel of the vehicle. This helps the driver of the vehicle properly orient the vehicle in preparation to connect the snowplow to the front of the vehicle. The alignment features 504 can be implemented using various technologies such as tags, labels, or the like.

Figure 7:
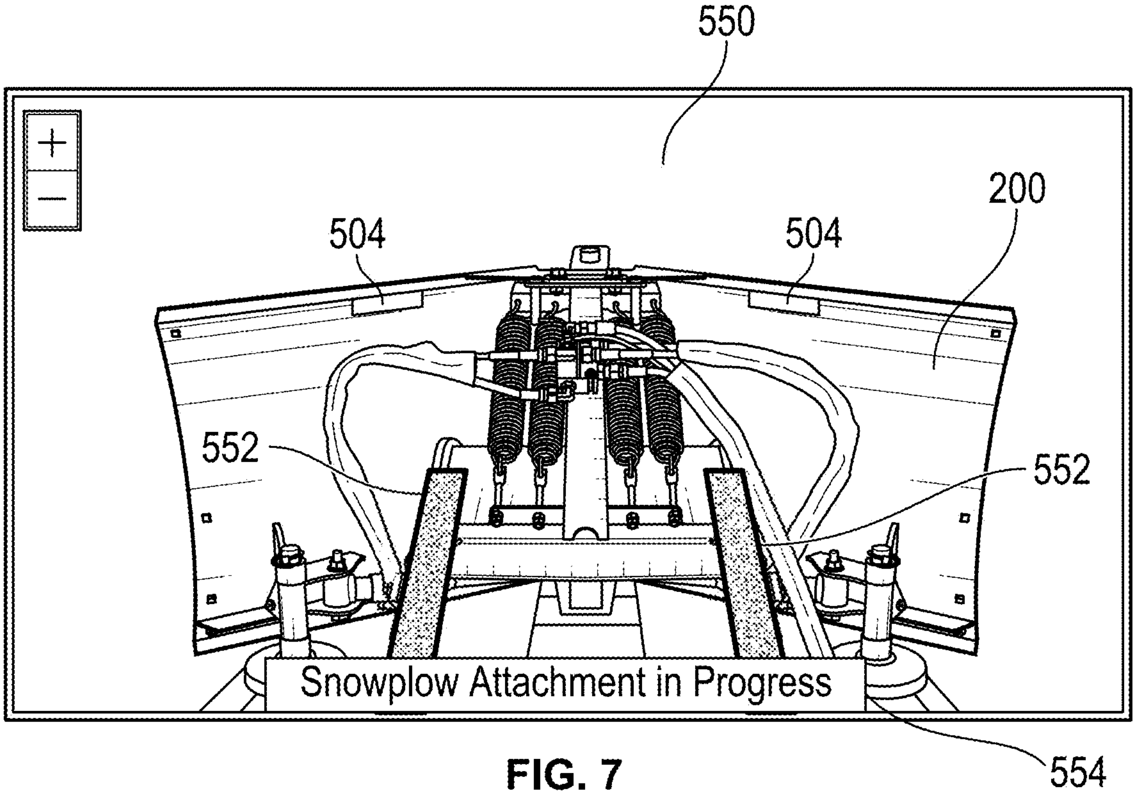
FIG. 7 illustrates a UI screen of a vehicle according to an embodiment of the present disclosure.

In addition to the alignment features on the snowplow, the vehicle may also be equipped to generate virtual alignment features indicating the location of the connection points of the snowplow bracket. FIG. 7 illustrates a UI screen of a vehicle according to an embodiment of the present disclosure. As mentioned above, there are several types of snowplow brackets available on the market. The make and model of the vehicle will typically dictate the type of snowplow bracket that can be installed on the vehicle. Each of these different snowplow brackets may have a different design and as such the locations of the connection points on these snowplow brackets are also different. When the snowplow bracket is first installed on the vehicle, the vehicle may be "taught" the location of the connection points of the snowplow bracket with reference to the front end of the vehicle. In some embodiments, the vehicle may learn the location of the connection points of the snowplow bracket based on one or more images taken of the front end of the vehicle. For example, the user of the vehicle may capture an image of the front end of the vehicle that includes the snowplow bracket and the connection points on the snowplow bracket. This image is sent to the vehicle (e.g., via the user device 112). The vehicle may then analyze the image to determine the location of the connection points of the snowplow bracket with respect to the front end of the vehicle. The vehicle may then generate virtual alignment features 552 and overlay them on the image captured by the front image sensor of the vehicle. FIG. 7 illustrates the screen 550 of the vehicle displaying an image captured by the front-facing camera/image sensor of the vehicle. The vehicle overlays the virtual alignment features 552 over that image. The virtual alignment features 552 indicate the location of the connection points of the snowplow brackets on the front side of the vehicle. Thus, the driver now has a visual indication of the location of the connection points of the snowplow bracket of the vehicle.

During the installation process, the snowplow 200 is placed in front of the vehicle. The vehicle displays the virtual markers 552 on a screen of the vehicle. The driver is also able to visually see the alignment features 504 on the snowplow 200. As described above, each alignment feature 504 corresponds to a corresponding connection point 502 on the snowplow. The driver can then maneuver the vehicle such that each of the virtual alignment markers 552 is aligned with a corresponding alignment feature 504 of the snowplow 200. This will ensure that the vehicle is in the correct orientation with respect to the snowplow. Once the vehicle is correctly oriented with respect to the snowplow, the installation of the snowplow may proceed further. In some embodiments, the vehicle 202 may display a notification 554 on the HMI interface alerting the driver and others that the snowplow attachment is in progress.

In one embodiment, at a first instance, the snowplow can be attached to the vehicle using manual techniques and without the use of any alignment features. Once the snowplow is attached to the vehicle, the front-facing image sensor of the vehicle may capture an image of the back side of the snowplow. The vehicle can then process this image to determine the relative position of the snowplow with respect to the front end of the vehicle. Based on the relative position of the snowplow, the vehicle may then determine the location of the connection points for the snowplow bracket of the vehicle. The vehicle may be provided with the dimensional information of the snowplow bracket. The vehicle may use this dimensional information along with the image captured by the front image sensor of the vehicle to determine the location of the connection points of the snowplow bracket. The vehicle may then generate the virtual alignment markers 552.

Figure 8:
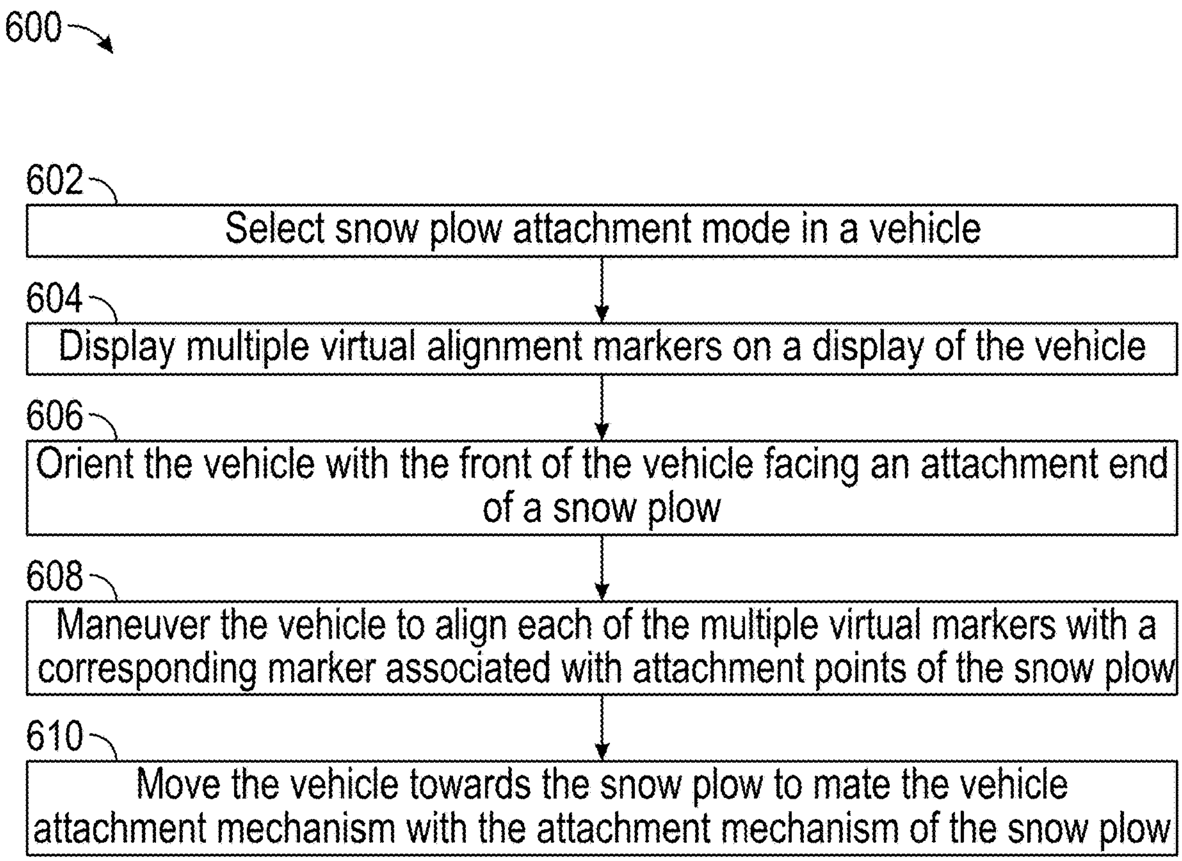
FIG. 8 illustrates a flow chart for a process for attaching a snowplow to a vehicle according to an embodiment of the present disclosure.

FIG. 8 illustrates a flow chart for a process 600 for attaching a snowplow to a vehicle according to an embodiment of the present disclosure. Process 600 can be performed solely by the vehicle 102 or the vehicle 102 in conjunction with the server 104. At step 602, the vehicle may receive an indication that a snowplow is to be attached to the front end of the vehicle. For example, the driver of the vehicle may make a selection on the HMI system of the vehicle indicating that a snowplow is to be attached to the vehicle. In response to the indication, the vehicle may display an image corresponding to the environment in front of the vehicle. The vehicle may overlay and display a plurality of virtual alignment features on the image, at step 604. After that, the vehicle may be oriented, either manually or autonomously, such that the front of the vehicle faces an attachment side of the snowplow, at step 606. The vehicle can then be maneuvered, by a driver or autonomously, to align each of the plurality of the virtual markers with a corresponding alignment marker associated with the connection point of the snowplow, at step 608. At step 610, the vehicle may then be moved closer to the snowplow such that the vehicle snowplow bracket attachment points mate with their corresponding attachment points of the snowplow. Thereafter, the installation of the snowplow may be finished by completing any required mechanical and electrical connections between the vehicle and the snowplow.

Figure 9:
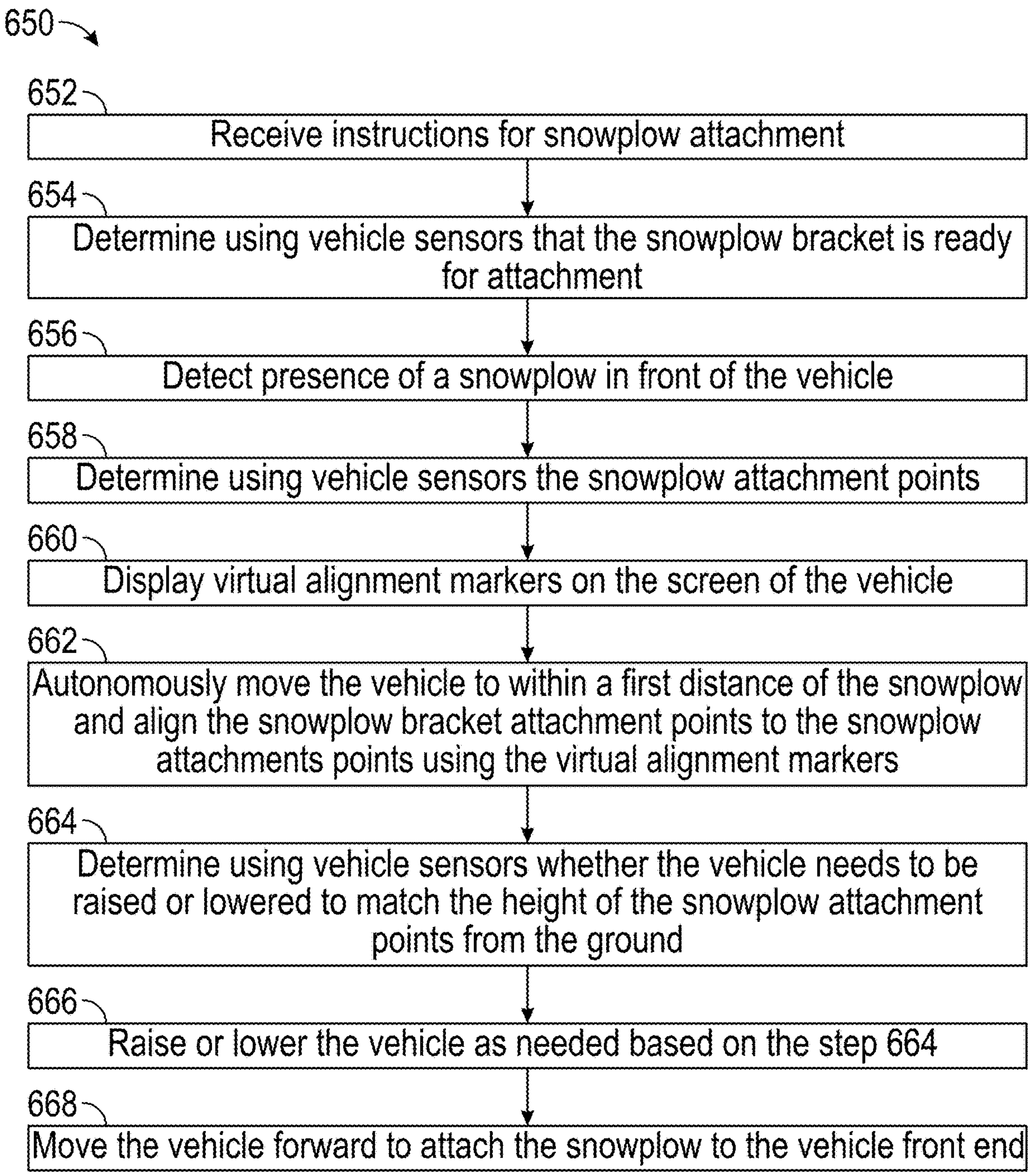
FIG. 9 illustrates a flow chart of a process for attaching a snowplow to a vehicle according to another embodiment of the present invention.

FIG. 9 illustrates a flow chart of a process 650 for attaching a snowplow to a vehicle according to another embodiment of the present invention. Process 650 can be performed solely by the vehicle 102 or the vehicle 102 in conjunction with the server 104. At step 652, the vehicle may receive information that the driver of the vehicle intends to attach a snowplow to the front of the vehicle. In an embodiment, the information may be received via the HMI system of the vehicle where the driver may select a mode associated with attaching a snowplow to the vehicle. After receiving the information, the vehicle may check using one or more of its sensors that the snowplow vehicle bracket is ready to accept a snowplow at step 654. For example, the vehicle may determine based on sensor data that there are no cables or other objects obstructing any portion of the vehicle snowplow bracket. At step 656, the vehicle may detect the presence of a snowplow in front of the vehicle. For example, the front-facing camera of the vehicle may detect the presence of the snowplow based on image and/or video data captured by the camera. At step 658, the vehicle may determine or may already know the location of the snowplow attachment points of the snowplow bracket. For example, the vehicle may determine the location of the snowplow attachment points of the snowplow bracket using any of the techniques described above. Once the vehicle determines the location of the snowplow connection points of the vehicle snowplow bracket, it may then generate and display virtual alignment markers associated with each of the snowplow attachment points of the snowplow bracket at step 660. In an embodiment, the virtual alignment markers may be overlaid on an image depicting an environment in the front of the vehicle including the snowplow.

At step 662, the vehicle may be manually moved, or the vehicle may autonomously move and position itself with a certain distance of the snowplow with the front of the vehicle facing the back of the snowplow. The vehicle may then maneuver itself or be mannered to align the virtual alignment markers to the alignment features of the snowplow. In an embodiment, the vehicle may enter a speed-control mode where the vehicle very slowly orients itself with respect to the snowplow. At step 664, the vehicle may determine whether it needs to be raised or lowered in order for the vehicle snowplow bracket connection points to be in the same horizontal plane as the snowplow connection points on the back of the snowplow. At step 666, the vehicle may use one or more of its sensors, such as external cameras, to determine the height of the snowplow connections points from the ground and based on that operate a suspension of the vehicle to bring the vehicle snowplow bracket connection points in the same plane as the snowplow connection points. Thereafter, at step 668, the vehicle may move towards the snowplow and cause the vehicle snowplow bracket connection points to mate with the snowplow connection points of the snowplow. The driver of the vehicle may then attach any electrical and/or other mech components between the vehicle and the snowplow to finish the installation.

Figure 10:
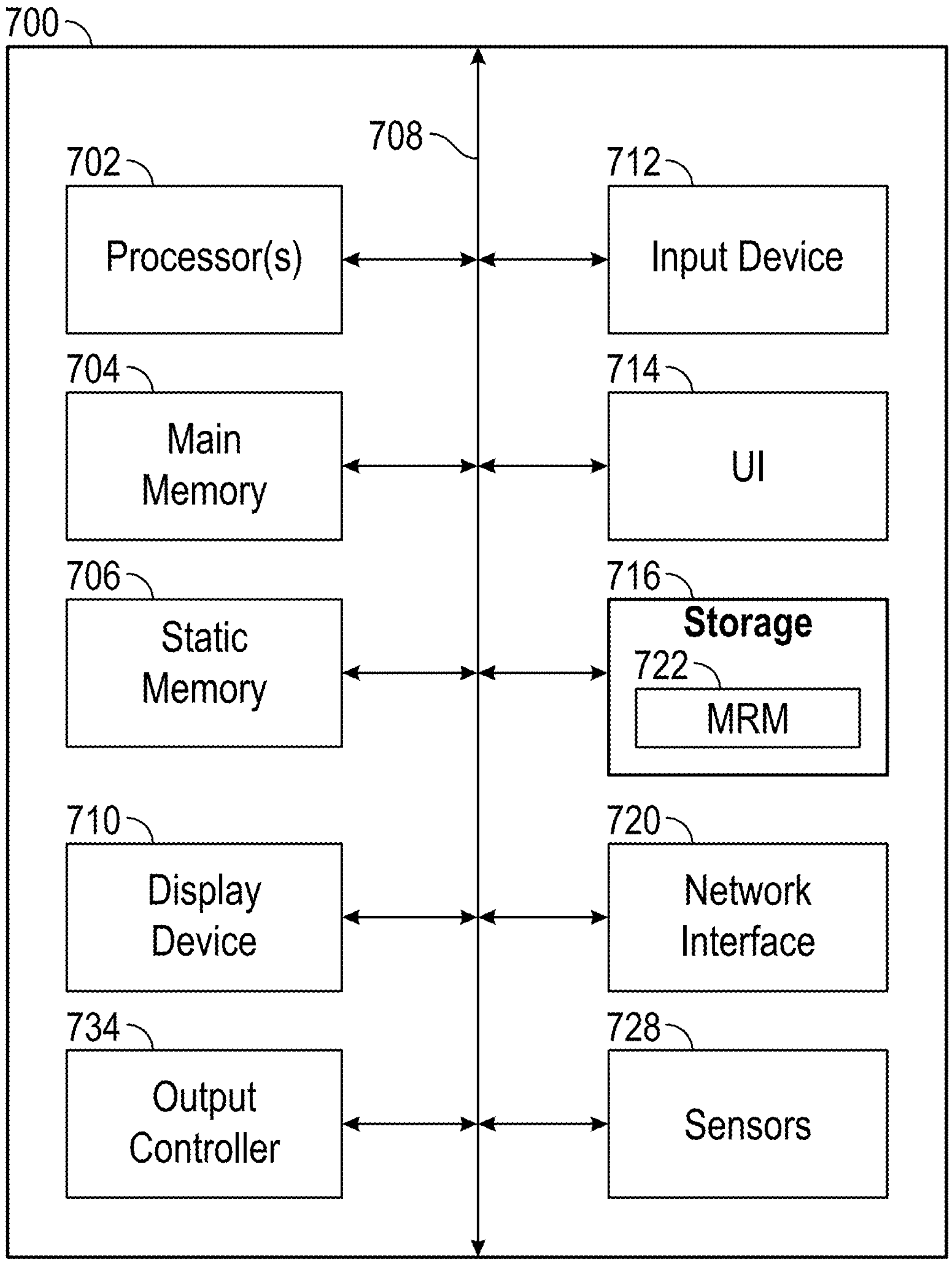
FIG. 10 illustrates a block diagram of a server according to an embodiment of the present disclosure.

FIG. 10 depicts a block diagram of an example control server 700, (e.g., control server 104 of FIG. 1) upon which any of one or more techniques (e.g., methods) may be performed or which may perform the methods described above in conjunction with the vehicle 102, in accordance with one or more example embodiments of the present disclosure. In other embodiments, the server 700 may operate as a standalone device or may be connected (e.g., networked) to other servers. In a networked deployment, the server 700 may operate in the capacity of a server machine, a client machine, or both in server-client network environments. In an example, the server 700 may act as a peer server in peer-to-peer (P2P) (or other distributed) network environments. The server 700 may be a personal computer (PC), a tablet PC, a set-top box (STB), a personal digital assistant (PDA), a mobile telephone, a smart key fob, a wearable computer device, a web appliance, a network router, a switch or bridge, or any machine capable of executing instructions (sequential or otherwise) that specify actions to be taken by that server, such as a base station. Further, while only a single server is illustrated, the term "server" shall also be taken to include any collection of servers that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific task when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The server (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The server 700 may further include a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The server 700 may additionally include a storage device (i.e., drive unit) 716, a network interface device/transceiver 720 coupled to antenna(s), and one or more sensors 728, such as a global positioning system (GPS) sensor, a compass, an accelerometer, or other sensor. The server 700 may include an output controller 734, such as a serial (e.g., universal serial bus (USB)), parallel, or other wired or wireless (e.g., infrared (IR)), near field communication (NFC), etc. connection to communicate with or control one or more peripheral devices (e.g., a printer, a card reader, etc.).

The storage device 716 may include a machine-readable medium 722 on which is stored one or more sets of data structures or instructions (e.g., software) embodying or utilized by any one or more of the techniques or functions described herein. The instructions may also reside, completely or at least partially, within the main memory 704, within the static memory 706, or within the hardware processor 702 during execution thereof by the server 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the server 700 and that cause the server 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions may further be transmitted or received over a communications network using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the server 700 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

It is to be noted that the vehicle implements and/or performs operations, as described here in the present disclosure, in accordance with the owner manual and safety guidelines. In addition, any action taken by the vehicle owner/driver based on recommendations or notifications provided by the vehicle should comply with all the rules specific to the location and operation of the vehicle (e.g., Federal, state, country, city, etc.). The recommendation or notifications, as provided by the vehicle, should be treated as suggestions and only followed according to any rules specific to the location and operation of the vehicle. In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:

receiving, by a vehicle, information related to attaching a snowplow to a front end of the vehicle;

displaying, by the vehicle on a screen of the vehicle, an image of an environment in the front end of the vehicle, the image including a depiction of the snowplow;

displaying, by the vehicle on the screen, a plurality of virtual alignment markers overlaid on the image, the plurality of virtual alignment markers indicating locations of connection points of the snowplow mounting bracket, the plurality of virtual alignment markers associated with a snowplow mounting bracket of the vehicle; and aligning, by the vehicle, each of the plurality of virtual alignment markers with a corresponding alignment feature of the snowplow.

2. The method of claim 1, wherein the snowplow mounting bracket is attached to the front end of the vehicle at a lower end closer to a ground surface.

3. The method of claim 1, further comprising:

receiving, by the vehicle, dimensional information associated with the snowplow mounting bracket; and determining, by the vehicle, a location of each of the plurality of virtual alignment markers based on the dimensional information.

4. The method of claim 1, further comprising:

determining, by the vehicle using one or more of its sensors, prior to the aligning, that the snowplow mounting bracket is ready for use.

5. The method of claim 1, wherein the aligning further comprising autonomously moving the vehicle to within a first distance of the snowplow.

6. The method of claim 1, wherein the snowplow mounting bracket includes a plurality of snowplow connection points and each of the plurality of virtual alignment markers is associated with a corresponding one of the plurality of snowplow connection points, the method further comprising:

determining, by the vehicle, a height of a plurality of connection points of the snowplow from a ground surface; and placing, by the vehicle, the plurality of snowplow connection points in a same plane as the plurality of connection points of the snowplow.

7. The method of claim 1, wherein the snowplow mounting bracket includes a plurality of snowplow connection points and each of the plurality of virtual alignment markers is associated with a corresponding one of the plurality of snowplow connection points.

8. A vehicle comprising:

one or more sensors;

one or more processors coupled to the one or more sensors; and one or more memory devices coupled to the one or more processors, wherein the one or more memory devices include instructions which when executed by the one or more processors cause the vehicle to:

determine, based on user input, that a snowplow is to be attached to a front side of the vehicle;

display, on a screen of the vehicle, an image of an external environment in front of the vehicle, the image including the snowplow;

display, on the screen, a plurality of virtual alignment markers overlaid on the image, the plurality of virtual alignment markers indicating locations of connection points of the snowplow mounting bracket, the plurality of virtual alignment markers associated with a snowplow mounting bracket of the vehicle; and orient itself with respect to the snowplow such that each of the plurality of virtual alignment markers is aligned with a corresponding alignment feature located on the snowplow.

9. The vehicle of claim 8, wherein each of the plurality of virtual alignment markers is associated with one of a plurality of connection points of the snowplow mounting bracket.

10. The vehicle of claim 8, wherein the snowplow mounting bracket is attached to a front end of the vehicle at a lower side closer to a ground surface.

11. The vehicle of claim 8, wherein the one or more processors further cause the vehicle to determine that the snowplow mounting bracket is ready to use.

12. The vehicle of claim 8, wherein the wherein the one or more processors further cause the vehicle to:

receive dimensional information associated with the snowplow mounting bracket; and determine a location of each of the plurality of virtual alignment markers based on the dimensional information.

13. The vehicle of claim 8, wherein the snowplow mounting bracket includes a plurality of snowplow connection points and each of the plurality of virtual alignment markers is associated with a corresponding one of the plurality of snowplow connection points, wherein the one or more processors further cause the vehicle to:

determine a height of a plurality of connection points of the snowplow from a ground surface; and place the plurality of snowplow connection points in a same plane as the plurality of connection points of the snowplow.

14. The vehicle of claim 8, wherein to orient itself with respect to the snowplow, the one or more processors further cause the vehicle to move autonomously to within a first distance from the snowplow.

15. A method comprising:

receiving, by a vehicle, an input indicating that a snowplow is to be attached to the vehicle;

determining, by the vehicle using one or more of its sensors, that a snowplow mounting bracket of the vehicle is ready for accepting the snowplow;

detecting, by the vehicle, presence of the snowplow in front of the vehicle;

determine, by the vehicle using the one or more sensors, a plurality of attachment points of the snowplow;

displaying, by the vehicle, a plurality of virtual alignment features overlaid on an image captured by a camera of the vehicle, the plurality of virtual alignment features indicating locations of connection points of the snowplow mounting bracket, on a display of the vehicle;

moving, autonomously by the vehicle, to within a first distance from the snowplow;

aligning, by the vehicle, each of the plurality of attachment points of the snowplow mounting bracket to a corresponding attachment point of the snowplow;

determining, by the vehicle using the one or more sensors, a height of the plurality of attachment points of the snowplow; and causing, by the vehicle, to place the plurality of attachment points of the snowplow mounting bracket in a same plane as the plurality of attachment points of the snowplow.

16. The method of claim 15, wherein the plurality of attachment points of the snowplow mounting bracket includes at least two attachment points.

17. The method of claim 15, further comprising:

displaying, by the vehicle on the display, an image of an external environment in front of the vehicle, the image including the snowplow.

18. The method of claim 15, wherein the snowplow includes a plurality of alignment tags each corresponding to an attachment point of the plurality of attachment points of the snowplow.

19. The method of claim 15, further comprising moving the vehicle to mate each of the plurality of attachment points of the snowplow to a corresponding one of the plurality of attachment points of the snowplow mounting bracket.

20. The method of claim 15, wherein the one or more sensors includes a camera having a field of view directed towards the front of the vehicle.

* * * * *